UNITED STATES PATENT OFFICE.

JAMES TURLINGTON, OF NEAR MORRISON, VIRGINIA.

INSECTICIDE.

SPECIFICATION forming part of Letters Patent No. 398,807, dated February 26, 1889.

Application filed December 19, 1888. Serial No. 294,101. (No specimens.)

*To all whom it may concern:*

Be it known that I, JAMES TURLINGTON, residing near Morrison, in the county of Warwick and State of Virginia, have invented certain new and useful Improvements in Insecticides; and I do hereby declare that the following is a full, clear, and exact description thereof.

My invention is an improvement in insecticides; and it consists in a novel composition for sprinkling vegetables and furniture to destroy vermin and worms; and its object is to provide a composition which will effectually destroy such vermin, but will not be deleterious to individuals, nor impregnate the articles to which it is applied with poisonous substances.

My insecticide is compounded of three pounds of lard; three pound boxes of concentrated lye, preferably of the well-known "Star" brand; three pounds of tobacco; six ounces of insect-powder, of the kind commonly known as "Persian Insect-Powder," and two and one-half gallons of kerosene or coal oil. These ingredients are compounded by boiling with water, enough of which is added to give a resultant mixture of fifty gallons measure.

The above is the proportion of ingredients in a fifty-gallon batch, and the same proportions are generally observed for smaller quantities of the mixture.

In preparing the mixture; I preferably take the lard (three pounds) and add thereto lye (one pound) and sufficient water to make five gallons of soft soap when properly boiled down in a proper vessel. I also boil the three pounds of tobacco—which may be manufactured or chewing tobacco or unworked leaf—in sufficient water to produce a strong extract. Then I add this tobacco-liquor to the prepared soap and put in the kerosene, insect-powder, and two additional pounds of lye, (making three in all,) and enough water to make up the fifty gallons measure after boiling. The ingredients are intimately commingled by stirring and boiling.

The mixture is applied in the ordinary manner by sprinkling or pouring it upon the vegetables or articles, and kills all insects, while it is not dangerous to the users. Vegetables on which it has been used can be washed, cooked, and eaten immediately without danger of the mixture having imparted any poisonous properties thereto.

The insect-powder might in some instances be dispensed with, as the other ingredients would drive away or destroy the insects, and also the proportions of the ingredients might be varied; but I deem the proportion and combination of various ingredients above set forth to be the best for the desired purpose.

Having described my invention, I claim, therefore—

The herein-described composition, consisting of kerosene, lard, lye, insect-powder, tobacco, and water, for the purpose and in or about the proportions described.

In testimony that I claim the foregoing as my own I affix my signature in presence of two witnesses.

JAMES X TURLINGTON.

Witnesses:
    A. E. DOWELL,
    M. P. CALLAN.